G. L. Squier,
Harvester Rake.
No. 34,909.  Patented April 8, 1862.
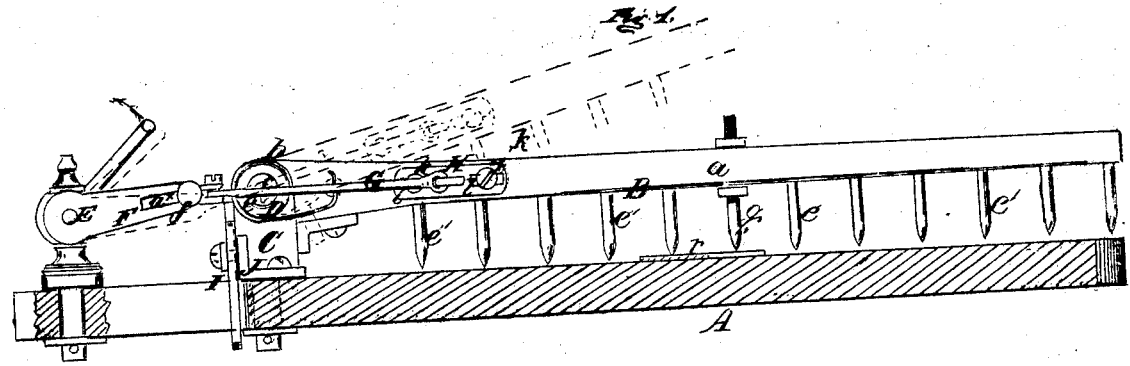
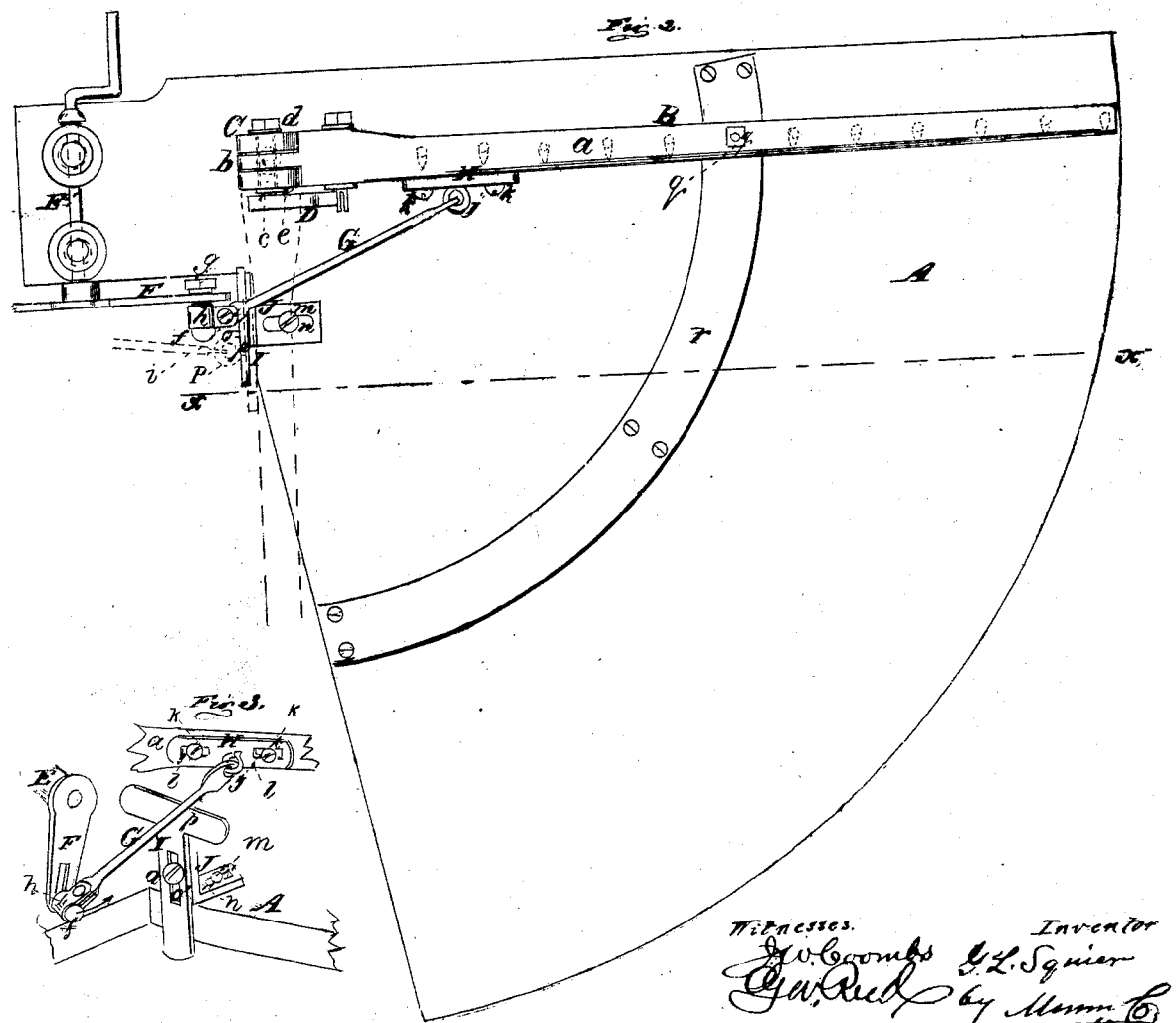
Witnesses.  Inventor

UNITED STATES PATENT OFFICE.

GEO. L. SQUIER, OF BUFFALO, NEW YORK.

IMPROVEMENT IN HARVESTER-RAKES.

Specification forming part of Letters Patent No. 34,909, dated April 8, 1862.

*To all whom it may concern:*

Be it known that I, GEORGE L. SQUIER, of Buffalo, in the county of Erie and State of New York, have invented a new and Improved Raking Device for Harvesters; and I do hereby declare that the following is a full, clear, and exact description of the same, reference being had to the accompanying drawings, making a part of this specification, in which—

Figure 1 is a vertical section of my invention, taken on the line $x\ x$, Fig. 1. Fig. 2 is a plan or top view of the same; Fig. 3, a detached perspective view of the mechanism by which the rake is operated.

Similar letters of reference indicate corresponding parts in the several figures.

The object of this invention is to obtain an automatic raking device for harvesters which will be extremely simple, efficient, economical to construct, and capable of being applied to the harvesters in common use, as well as capable of being adapted for working in various kinds of grain.

To enable those skilled in the art to fully understand and construct my invention, I will proceed to describe it.

A represents the platform of the harvester, and B is a rake, the head $a$ of which is connected at one end by a joint, $b$, to the upper end of a vertical post, C, the lower part of which passes through the platform at its front edge and at one side near the driving-wheel of the harvester. The post C is allowed to turn freely in the platform, and it forms a swivel for the rake.

D is a coil-spring, one end of which is attached to the post C, the opposite end being attached to the rake-head $a$. This spring has a tendency to keep the rake down on the platform, and the strength of the spring may be regulated, as desired, by turning a pin, $c$, which connects the springs to the post C, said pin passing through the post C, and having a nut, $d$, on one end, and a shoulder or collar, $e$, near its opposite end, the collar $e$ bearing against one side of the post, and the nut $d$ against the opposite side, as shown clearly in Fig. 2. The rake-head $a$ is provided with teeth $e'$, which have an oblique position, the lower ends of the teeth inclining backward.

E is a shaft, which is fitted in suitable bearings on the platform A, and which has a crank, F, on its inner end. This crank F has an oblong slot, $a^{x}$, near its outer end to receive a pin, $f$, which is secured in the slot by a nut, $g$. To the pin $f$ one end of a connecting-rod, G, is attached by a strap, $h$, which is fitted loosely on the pin and has the end of the connecting-rod fitted in it by a screw or pin, $i$, to admit of a lateral movement of the rod. This will be fully understood by referring to Fig. 2. The opposite end of the connecting-rod G is connected by a link or universal joint, $j$, to a plate, H, which is secured to the rake-head $a$ by screws $k\ k$, said screws passing through oblong slots $l\ l$ in the plate H, and into the head $a$, as shown clearly in Figs. 1 and 3.

I is a T-shaped bearing-plate, which is secured to a bracket, J, attached to the platform A at a point near the post or swivel-head C. This bracket is attached to the platform by means of a screw, $m$, which passes through an oblong slot, $n$, in the horizontal part of the bracket and into the platform, and the T-shaped bearing I is attached to the vertical part of the bracket J by a screw, $o$, which passes through an oblong slot, $o'$, in the vertical part of the bearing and into the vertical part of the bracket. The upper horizontal part, $p$, of the bearing I is the part in which the connecting-rod G acts or bears during the forward movement of the rake.

The rake-head $a$ has a tooth, $g$, which is a trifle longer than the others, and serves as a support for the rake when the latter moves back over the platform, the end of said tooth resting on a segment metal plate, $r$, which is secured on the platform.

The operation is as follows: The shaft E may be rotated in any proper way from the driving-wheel of the machine. The shaft E is rotated in the direction indicated by the arrow. In commencing, suppose the rake B to have just fallen upon the platform A, at the rear of the cutter or sickle. When the rake is in this position, the crank F is in a horizontal position, as shown in Fig. 1, and as said crank moves upward and outward from the platform A the rake B is drawn over the surface of the platform and the cut grain is raked therefrom and discharged at the back of the crank in a gavel, the crank F moving just half a revolution to effect this result. As the crank moves through the other half of its revolution—to wit, downward and toward the platform A—the connecting-rod G is pressed down on the upper horizontal part, *p*, of the bearing I, and the rake B is consequently elevated, as shown in red, Fig. 1, and shoved forward toward the front end of the platform A, the rake being sufficiently elevated to avoid the falling grain as it is deposited on the platform, the rake dropping and being forced down by the spring D as the crank F reaches the horizontal position it had at the commencement of the operation. The rake is then again drawn over the platform, as before, to deposit a succeeding gavel on the ground. It will be observed that when the rake B rises to commence its forward elevated movement it rises obliquely, and this oblique movement, in connection with the oblique position of the teeth *e'*, enables the latter to slip easily out of the gavel, so that the straw will not be raised by the teeth and scattered about. It will also be observed that the rake B, in falling, has an oblique movement, which enables it to strike under the reel of the harvester, and consequently without coming in contact with it. The rake may be made to rise and fall more or less perpendicularly, and, in fact, the curve which it thus describes can be varied by adjusting the bearing I higher or lower or farther backward and forward. It can also be varied by bending the connecting-rod G, or making the part *p* of the bearing I curved. The point at which the rake-fingers *e'* begin to rise from the platform and to fall upon it can also be varied by similar adjustments.

From the above description it will be seen that the invention is simple, durable, cheaply and easily constructed, and capable of being readily adjusted to the different kinds of grain upon which it is to operate. It may be easily adapted to the machines now in common use, and in case of any breakage or accident occurring in the field, where means are not at hand to repair it, it may be readily detached from the machine and a hand-rake substituted, thereby causing no delay for repairs.

I would remark that during the first quarter of a revolution of the crank F—that is, when it is moving from the horizontal position first specified, as shown in Fig. 1, to a vertical position—the rake passes over much more space than during the remaining portion of the revolution. The rake consequently has the most rapid movement from the time it commences to fall toward the platform till it starts the grain and moves it out of the way of the falling grain. This is a very essential feature in the operation of the rake. The connecting-rod G may be adjusted by adjusting the plates H and the pin *f* in the slot $a^\times$ of the crank F, so as to vary the stroke of the crank, and consequently the length of movement of the rake, as may be required to suit grain of different lengths.

Under the rake, or to the under side of the rake-head *a*, there is attached an adjustable stop, *s*, by which the fall of the rake can be stopped at any desired point, said stop coming in contact with the post or swivel head C. (See Fig. 1.)

Having thus described my invention, what I claim as new, and desire to secure by Letters Patent, is—

1. The employment or use of the crank F, or its equivalent, connecting-rod G, and bearing I, arranged substantially as shown and used, in connection with the post or swivel-head C, for operating the rake B, as set forth.

2. The arrangement of the adjustable bearing I, of the connecting-rod G, and the adjustable plate H, which connects the front end of the rod G with the rake-head *a*, in combination with the adjustable pin *f*, which connects the back or outer end of the connecting-rod to the crank F, substantially as described, whereby the movement of the rake B may be modified or varied, as set forth.

GEO. L. SQUIER.

Witnesses:
CHARLES GARDNER,
LUCIAN HAWLEY.